(12) United States Patent
Ilkov

(10) Patent No.: US 12,038,373 B2
(45) Date of Patent: Jul. 16, 2024

(54) CLUSTERED WAVELENGTH DIVISION LIGHT DETECTION SYSTEMS AND METHODS OF USING THE SAME

(71) Applicant: Becton, Dickinson and Company, Franklin Lakes, NJ (US)

(72) Inventor: Fedor Ilkov, Morgan Hill, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 18/235,730

(22) Filed: Aug. 18, 2023

(65) Prior Publication Data
US 2023/0417648 A1 Dec. 28, 2023

Related U.S. Application Data

(63) Continuation of application No. 17/159,453, filed on Jan. 27, 2021, now Pat. No. 11,821,830.
(Continued)

(51) Int. Cl.
*G01N 15/1434* (2024.01)
*G01N 15/01* (2024.01)
(Continued)

(52) U.S. Cl.
CPC ..... *G01N 15/1434* (2013.01); *G02B 27/1013* (2013.01); *G02B 27/141* (2013.01); *G02B 27/145* (2013.01); *G01N 15/01* (2024.01)

(58) Field of Classification Search
CPC .. G01N 15/1434; G01N 15/01; G01N 15/149; G01N 2015/1006; G01N 15/1459;
(Continued)

(56) References Cited

U.S. PATENT DOCUMENTS 7,304,310 B1 12/2007 Shortt et al.
11,821,830 B2 * 11/2023 Ilkov ................. G01N 15/1434
(Continued)

FOREIGN PATENT DOCUMENTS

JP 2008164399 A1 7/2008
KR 20130138214 A 12/2013

OTHER PUBLICATIONS

Brittain, et al: "A Novel Semiconductor-Based Flow Cytometer with Enhanced Light-Scatter Sensitivity for the Analysis of Biological Nanoparticles", Scientific Reports, vol. 9, No. 1, 2019.

*Primary Examiner* — David P Porta
*Assistant Examiner* — Meenakshi S Sahu
(74) *Attorney, Agent, or Firm* — Bret E. Field; BOZICEVIC, FIELD & FRANCIS LLP

(57) ABSTRACT

Systems for detecting light (e.g., in a flow stream) are described. Light detection systems according to certain embodiments include a wavelength separator configured to generate first, second and third predetermined spectral ranges of light from a light source and first, second and third light detection modules configured to receive each of the first, second and third predetermined spectral ranges of light, the light detection modules having a plurality of photodetectors and an optical component that conveys light having a predetermined sub-spectral range to the photodetectors. Systems and methods for measuring light emitted by a sample (e.g., in a flow stream) and kits having three or more wavelength separators, a plurality of photodetectors and an optical component are also provided.

27 Claims, 12 Drawing Sheets

Related U.S. Application Data

(60) Provisional application No. 62/971,840, filed on Feb. 7, 2020.

(51) Int. Cl.
*G02B 27/10* (2006.01)
*G02B 27/14* (2006.01)

(58) Field of Classification Search
CPC .. G01N 21/01; G02B 27/1013; G02B 27/141; G02B 27/145
See application file for complete search history.

(56) References Cited

U.S. PATENT DOCUMENTS

| | | |
|---|---|---|
| 2005/0203421 A1 | 9/2005 | Zeng et al. |
| 2016/0377548 A1* | 12/2016 | Sappey .............. G01N 21/6489 250/459.1 |
| 2018/0246029 A1 | 8/2018 | Wu et al. |

* cited by examiner

CLUSTERED WAVELENGTH DIVISION LIGHT DETECTION SYSTEMS AND METHODS OF USING THE SAME

CROSS-REFERENCE TO RELATED APPLICATION

This application is a continuation of U.S. patent application Ser. No. 17/159,453 filed Jan. 27, 2021 which claims priority to U.S. Provisional Patent Application Ser. No. 62,971,840 filed Feb. 7, 2020. The disclosures of which applications are incorporated herein in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector. The amount of light that reaches the detector can impact the overall quality of the optical signal outputted by the detector. The amount of light that reaches the detector can be raised by increasing the surface area of the detector or by increasing collection of the light from the sample.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include clustered wavelength division light detection systems having three or more wavelength separators that pass light having a predetermined spectral range. The present disclosure provides light detection systems which separate detected light into spectral ranges and require fewer reflections of the light in order to generate a plurality of sub-spectral ranges detected by photodetectors in the subject systems. The inventors have discovered that reflections to generate distinct spectral ranges of light result in increasing light loss, in certain instances causing poor detector signal quality (e.g., low signal to noise ratio). The present disclosure reduces the amount of light loss that result from reflections by optical components in generating distinct spectral ranges for light detection. According to certain embodiments, as described in greater detail below, the present disclosure is capable of generating or more distinct spectral ranges of light while exhibiting a light loss of 20% or less, such as 19% or less, such as 18% or less, such as 17% or less, such as 16% or less, such as 15% or less and including generating 20 or more distinct spectral ranges of light while exhibiting a light loss of 10% or less. In some embodiments, light detection systems are configured to generate 2 or more distinct spectral ranges of light for every reflection by an optical component (e.g., dichroic mirror), such as 3 or more distinct spectral ranges. In certain instances, the light detection system is configured to generate 30 distinct spectral ranges of light from 10 reflections by optical components or less, such as generating 30 distinct spectral ranges of light from 9 reflections by optical components or less.

Light detection systems according to certain embodiments include a wavelength separator configured to generate first, second and third predetermined spectral ranges of light from a light source and first, second and third light detection modules configured to receive each of the first, second and third predetermined spectral ranges of light, the light detection modules having a plurality of photodetectors and an optical component that conveys light having a predetermined sub-spectral range to the photodetectors. In certain instances, the wavelength separator is a prism or a diffraction grating. In certain embodiments, light detection systems include three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors. In some embodiments, the wavelength separators are configured to convey light between each other. The wavelength separators may be positioned along a single plane or along two or more parallel planes. In certain embodiments, the wavelength separators are positioned in a polygonal configuration, such as a pentagonal or hexagonal configuration. In embodiments, the wavelength separators are configured to pass light of a predetermined spectral range. In some embodiments, the wavelength separators are configured to pass light having wavelengths that range from 200 nm to 1200 nm, such as from 360 nm to 960 nm. In some embodiments, the wavelength separators are each configured to pass light having a spectral range that spans from 75 nm to 150 nm. In certain instances, the wavelength separators are each configured to pass light having a spectral range that spans 100 nm (e.g., pass light having wavelengths that range from 360 nm to 460 nm).

Light detection systems include one or more light detection modules in optical communication with each wavelength separator. In embodiments, each light detection module includes a plurality of photodetectors and an optical component configured to convey light having a predetermined sub-spectral range to the photodetectors. In some embodiments, each optical component is configured to pass light having a sub-spectral range of from 5 nm to 50 nm to each photodetector, such as a sub-spectral range of about 20 nm to each photodetector. The photodetectors and optical components may be positioned in each light detection module along a single plane or along two or more parallel planes. In certain embodiments, the photodetectors and optical components are positioned in a polygonal configuration, such as a hexagonal, heptagonal or octagonal configuration in each light detection module.

Aspects of the present disclosure also include systems for measuring light from a sample (e.g., in a flow stream). In certain embodiments, systems include a light source and a clustered wavelength division light detection system that include three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors. In some embodiments, systems also include an optical collection system for propagating light to the light detection system. The optical collection system may be a free-space light relay system or may include fiber optics such as a fiber optics light relay bundle. In some embodiments, the system is a flow cytometer.

Aspects of the disclosure also include methods for irradiating a sample (e.g., in a flow stream) in an interrogation field with a light source, collecting and detecting light from the sample with the subject light detection systems and measuring the detected light at one or more wavelengths. In some embodiments, light is collected and conveyed to the light detection system by a free-space light relay system. In other embodiments, light is collected and conveyed to the light detection system by fiber optics, such as a fiber optics light relay bundle.

Kits including one or more components of the subject light detection systems are also provided. Kits according to certain embodiments, include three or more wavelength separators, a plurality of photodetectors and an optical component. In embodiments, the optical component includes a collimator, beam splitter, a wavelength separator or a combination thereof. Kits may also include one or more photodetectors, such as photomultiplier tubes (e.g., metal package photomultiplier tubes).

BRIEF DESCRIPTION OF THE FIGURES

FIG. 7A depicts a light detection system having three wavelength separators optically coupled to light detection modules. FIG. 7B depicts a light detection system having four wavelength separators optically coupled to light detection modules. FIG. 7C depicts a light detection system having five wavelength separators optically coupled to light detection modules. FIG. 7D depicts a light detection system having six wavelength separators optically coupled to light detection modules. FIG. 7E depicts a three dimensional view of the light detection system of FIG. 7D.

DETAILED DESCRIPTION

Figure 1A:
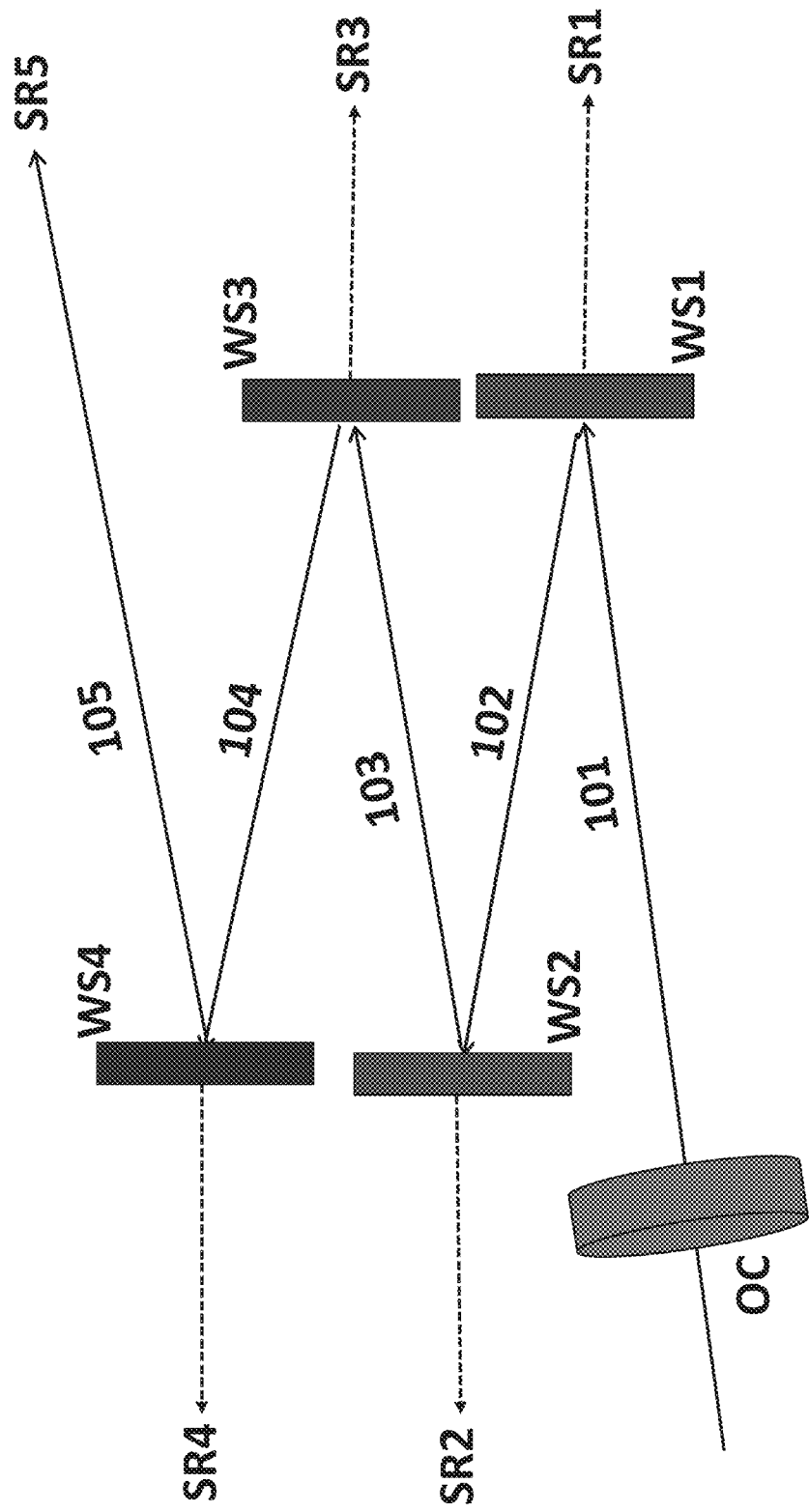
FIG. 1A depicts a configuration of wavelength separators positioned along two parallel planes in a light detection system according to certain embodiments.

Systems for detecting light (e.g., in a flow stream) are described. Light detection systems according to certain embodiments include a wavelength separator configured to generate first, second and third predetermined spectral ranges of light from a light source and first, second and third light detection modules configured to receive each of the first, second and third predetermined spectral ranges of light, the light detection modules having a plurality of photodetectors and an optical component that conveys light having a predetermined sub-spectral range to the photodetectors. Systems and methods for measuring light emitted by a sample (e.g., in a flow stream) and kits having three or more wavelength separators, a plurality of photodetectors and an optical component are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Light Detections Systems

Aspects of the present disclosure include clustered wavelength division light detection systems configured for detecting light from a sample (e.g., light obtained from a flow stream of a flow cytometer). Light detection systems according to certain embodiments include a wavelength separator configured to generate first, second and third predetermined spectral ranges of light from a light source and first, second and third light detection modules configured to receive each of the first, second and third predetermined spectral ranges of light, the light detection modules having a plurality of photodetectors and an optical component that conveys light having a predetermined sub-spectral range to the photodetectors. In certain instances, the wavelength separator is a prism or a diffraction grating. In some embodiments, light detection systems include three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors.

In embodiments, light from a sample is divided into three or more spectral ranges by passing the light through the one or more wavelength separators. Each spectral range of light generated by the wavelength separators is further divided into smaller sub-spectral ranges which are detected by the photodetectors. In some embodiments, light detected from the sample is emitted light such as fluorescent light. In other embodiments, light detected from the sample is scattered light. The term "scattered light" is used herein in its conventional sense to refer to the propagation of light energy from particles in the sample (e.g., flowing in a flow stream) that are deflected from the incident beam path, such as by reflection, refraction or deflection of the beam of light.

In embodiments, light detection systems as described herein are configured to exhibit little to no light loss from the light collected from the sample. In some embodiments, light loss due to conveyance of light through the subject light detection system is 25% or less, such as 20% or less, such as 15% or less, such as 10% or less, such as 5% or less, such as 1% or less, such as 0.5% or less, such as 0.1% or less, such as 0.01% or less and including 0.001% or less. In certain instances, there is no light loss from propagating light from the sample through the subject light detection systems (i.e., shows no measureable light loss). For example, the amount of light from the sample decreases by 1 mW/cm 2 or less when conveyed through the subject light detection systems, such as 0.5 mW/cm 2 or less, such as 0.1 mW/cm 2 or less, such as 0.05 mW/cm 2 or less, such as 0.01 mW/cm 2 or less, such as 0.005 mW/cm 2 or less, such as 0.001 mW/cm 2 or less, such as 0.0005 mW/cm 2 or less, such as 0.0001 mW/cm 2 or less, such as 0.00005 mW/cm 2 or less and including 0.00001 mW/cm 2 or less.

As described herein, light detection systems are configured to generate a plurality of sub-spectral ranges of light from the light collected from the sample. In some embodiments, 5 or more sub-spectral ranges of light are generated from the light collected from the sample, such as 10 or more, such as 15 or more, such as 20 or more, such as 25 or more, such as 30 or more, such as 35 or more, such as 40 or more, such as 45 or more and including 50 or more sub-spectral ranges of light. In these embodiments, the light loss exhibited by light detections systems and methods described herein is 20% or less, such as 19% or less, such as 18% or less, such as 17% or less, such as 16% or less, such as 15% or less and including exhibiting a light loss of 10% or less. For example, 5 or more sub-spectral ranges of light may be generated from the light collected from the sample where the light from the sample decreases by 1 mW/cm 2 or less when conveyed through the subject light detection systems, such as 0.5 mW/cm 2 or less, such as 0.1 mW/cm 2 or less, such as 0.05 mW/cm 2 or less, such as 0.01 mW/cm 2 or less, such as 0.005 mW/cm 2 or less, such as 0.001 mW/cm 2 or less, such as 0.0005 mW/cm 2 or less, such as 0.0001 mW/cm 2 or less, such as mW/cm 2 or less and including 0.00001 mW/cm 2 or less.

Light propagating through the subject light detection system exhibits little to no divergence. In other words, there is little, if any, change to the light beam as it conveys through the wavelength separators and to the photodetectors. In some embodiments, the focal radius of light conveyed through the subject light detection systems increases by 5% or less, such as 4% or less, such as 3% or less, such as 2% or less, such as 1% or less, such as 0.5% or less, such as or less, such as 0.01% or less, such as 0.001% or less and including 0.0001% or less. In certain instances, the focal radius of light conveyed through the subject light detection systems does not increase at all (i.e., shows no measureable increase in focal radius) For example, depending on the size of the light beam conveyed through the light detection system, the diameter of the beam of light increases by 2 mm or less, such as 1.5 mm or less, such as 1 mm or less, such as 0.9 mm or less, such as 0.8 mm or less, such as 0.7 mm or less, such as 0.6 mm or less, such as 0.5 mm or less, such as 0.4 mm or less, such as mm or less, such as 0.2 mm or less, such as 0.1 mm or less, such as 0.05 mm or less, such as 0.01 mm or less, such as 0.001 mm or less, such as 0.0001 mm or less and including 0.00001 mm or less. In certain instances, the diameter of the beam of light exhibits no measurable increase when conveyed through the light detection system (i.e., increases by 0 mm).

In some embodiments, wavelength separators are configured to generate three or more predetermined spectral ranges of light from a light source (e.g., light from a sample irradiated with light, as described in detail below), such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more predetermined spectral ranges of light. In certain instances, light detection systems include a wavelength separator configured to generate first, second and third predetermined spectral ranges of light from a light source.

In some embodiments, light detection systems include 3 or more wavelength separators, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. The term "wavelength separator" is used herein in its conventional sense to refer to an optical component that is configured to separate light collected from the sample into predetermined spectral ranges. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

In embodiments, the wavelength separators are configured to pass light having wavelengths that range from a first wavelength, $X_i$ (in nanometers, nm) to a second wavelength $X_n$ (in nanometers, nm). In some embodiments, the wavelength separators are configured to pass light having wavelengths that range from $X_i$ to $X_n$, such as from 100 nm to 1500 nm, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including passing light having wavelengths that range from 600 nm to 1000 nm. In certain embodiments, wavelength separators in light detection systems of interest are configured to pass light having wavelengths that range from 360 nm to 960 nm.

In embodiments, wavelength separators of interest are each configured to generate predetermined spectral ranges of light, $X_s$ (in nanometers, nm). The predetermined spectral ranges may vary, where in certain embodiments, wavelength separators of interest are configured to generate spectral ranges ($X_s$) of light that span from 50 nm to 300 nm, such as from 75 nm to 275 nm, such as from 100 nm to 250 nm, such as from 125 nm to 225 nm and including from 150 nm to 200 nm. In certain embodiments, each wavelength separator is configured to generate a spectral range of light that spans 100 nm (i.e., $X_s$=100 nm).

In one example, light detection systems include a wavelength separator that is configured to generate a first predetermined spectral range of light of from 360 nm to 480 nm; a second predetermined spectral range of light of from 480 nm to 600 nm; a third predetermined spectral range of light of from 600 nm to 720 nm; a fourth predetermined spectral range of light of from 720 nm to 840 nm; and a fifth predetermined spectral range of light of from 840 nm to 960 nm.

In another example, light detection systems include a first wavelength separator configured to pass light having a wavelength that ranges from 360 nm to 480 nm (i.e., $X_s$=120 nm); a second wavelength separator configured to pass light having a wavelength that ranges from 480 nm to 600 nm; a third wavelength separator configured to pass light having a wavelength that ranges from 600 nm to 720 nm; a fourth wavelength separator configured to pass light having a wavelength that ranges from 720 nm to 840 nm; and a fifth wavelength separator configured to pass light having a wavelength that ranges from 840 nm to 960 nm.

In some embodiments, light detection systems of interest include three or more wavelength separators that are in optical communication with each other, such as being positioned to convey light between each other. The wavelength separators may be oriented with respect to each other in the light detection system (as referenced in an X-Z plane) at an angle ranging from 10° to 180°, such as from 15° to 170°, such as from 20° to 160°, such as from 25° to 150°, such as from 30° to 120° and including from 45° to 90°. In some instances, the wavelength separators are positioned along a single plane. In other instances, the wavelength separators are positioned along more than one plane. For example, the wavelength separators may be positioned along two or more parallel planes, such as three or more, such as four or more and including five or more parallel planes. In certain instances, the wavelength separators are arranged into a geometric configuration, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. In certain embodiments, the wavelength separators are arranged in a pentagonal configuration. In other embodiments, the wavelength separators are arranged in a hexagonal configuration.

In some embodiments, the wavelength separators are configured to convey light between each other. In some instances, each wavelength separator is configured to pass a spectral range of light and to convey (e.g., by reflection) one or more remaining spectral ranges of light to another wavelength separator. In one example, the light detection system includes 3 wavelength separators. The first wavelength separator is configured to receive light from the sample and to pass a first spectral range of light and convey a second spectral range of light to the second wavelength separator. The second wavelength separator is configured to pass a third spectral range of light and to convey a fourth spectral range of light to the third wavelength separator. In some instances, the third spectral range of light is a portion of the second spectral range of light, such as a spectral range that spans 90% or less of the second spectral range of light, such 85% or less, such as 80% or less, such as 75% or less, such as 70% or less, such as 65% or less, such as 60% or less, such as 55% or less, such as 50%. The third wavelength separator is configured to pass a fifth spectral range of light. In some instances, the fifth spectral range of light is a portion of the fourth spectral range of light, such as a spectral range that spans 90% or less of the fourth spectral range of light, such 85% or less, such as 80% or less, such as 75% or less, such as 70% or less, such as 65% or less, such as 60% or less, such as 55% or less, such as 50%.

In another example, the light detection system includes 5 wavelength separators. The first wavelength separator is configured to receive light from the sample and to pass a first spectral range of light and convey a second spectral range of light to the second wavelength separator. The second wavelength separator is configured to pass a third spectral range of light and to convey a fourth spectral range of light to the third wavelength separator. In some instances, the third spectral range of light is a portion of the second spectral range of light, such as a spectral range that spans 90% or less of the second spectral range of light, such 85% or less, such as 80% or less, such as 75% or less, such as 70% or less, such as 65% or less, such as 60% or less, such as 55% or less, such as 50%. The third wavelength separator is configured to pass a fifth spectral range of light and to convey a sixth spectral range of light to the fourth wavelength separator. In some instances, the fifth spectral range of light is a portion of the fourth spectral range of light, such as a spectral range that spans 90% or less of the fourth spectral range of light, such 85% or less, such as 80% or less, such as 75% or less, such as 70% or less, such as 65% or less, such as 60% or less, such as 55% or less, such as 50%. The fourth wavelength separator is configured to pass a seventh spectral range of light and to convey an eighth spectral range of light to the fifth wavelength separator. In some instances, the seventh spectral range of light is a portion of the sixth spectral range of light, such as a spectral range that spans 90% or less of the sixth spectral range of light, such 85% or less, such as 80% or less, such as 75% or less, such as 70% or less, such as 65% or less, such as 60% or less, such as 55% or less, such as 50%. The fifth wavelength separator is configured to pass a ninth spectral range of light. In some instances, the ninth spectral range of light is a portion of the eighth spectral range of light, such as a spectral range that spans 90% or less of the eighth spectral range of light, such 85% or less, such as 80% or less, such as 75% or less, such as 70% or less, such as 65% or less, such as 60% or less, such as 55% or less, such as 50%.

In certain embodiments, the light detection system includes 5 wavelength separators configured to separate light having wavelengths ranging from 360 nm to 960 nm, where the first wavelength separator is configured to pass light having a wavelength ranging from 360 nm to 480 nm and to convey light having a wavelength that ranges from 480 nm to 960 nm to the second wavelength separator; the second wavelength separator is configured to pass light having a wavelength ranging from 480 nm to 600 nm and to convey light having a wavelength that ranges from 600 nm to 960 nm to the third wavelength separator; the third wavelength separator is configured to pass light having a wavelength ranging from 600 nm to 720 nm and to convey light having a wavelength that ranges from 720 nm to 960 nm to the fourth wavelength separator; and the fourth wavelength separator is configured to pass light having a wavelength ranging from 720 nm to 840 nm and to convey light having a wavelength ranging from 840 nm to 960 nm to the fifth wavelength separator. In this embodiment, the fifth wavelength separator is configured to pass light having a wavelength ranging from 840 nm to 960 nm.

FIG. 1A depicts a configuration of wavelength separators positioned along two parallel planes in a light detection system according to certain embodiments. Light from a sample is conveyed through an optical collection system OC having an optical component configured to pass light having a set of wavelengths 101 (e.g., 360 nm to 960 nm) to a first wavelength separator WS1 that is configured to pass a first spectral range of light SR1 (e.g., 360 nm to 480 nm) and convey light having a set of wavelengths 102 (e.g., 480 nm to 960 nm) to a second wavelength separator WS2. The second wavelength separator WS2 is configured to pass a second spectral range of light SR2 (e.g., 480 nm to 600 nm) and convey light having a set of wavelengths 103 (e.g., 600 nm to 960 nm) to a third wavelength separator WS3. The third wavelength separator WS3 is configured to pass a third spectral range of light SR3 (e.g., 600 nm to 720 nm) and convey light having a set of wavelengths 104 (e.g., 720 nm to 960 nm) to a fourth wavelength separator WS4. The fourth wavelength separator WS4 is configured to pass a fourth spectral range of light SR4 (e.g., 720 nm to 840 nm) and convey light having a fifth spectral range of light SR5 (e.g., 840 nm to 960 nm). In this embodiment, light is conveyed along a zig-zag light path. Each of spectral ranges of light SR1, SR2, SR3, SR4 and SR5 are conveyed to one or more light detection modules (as described in greater detail below).

Figure 1B:
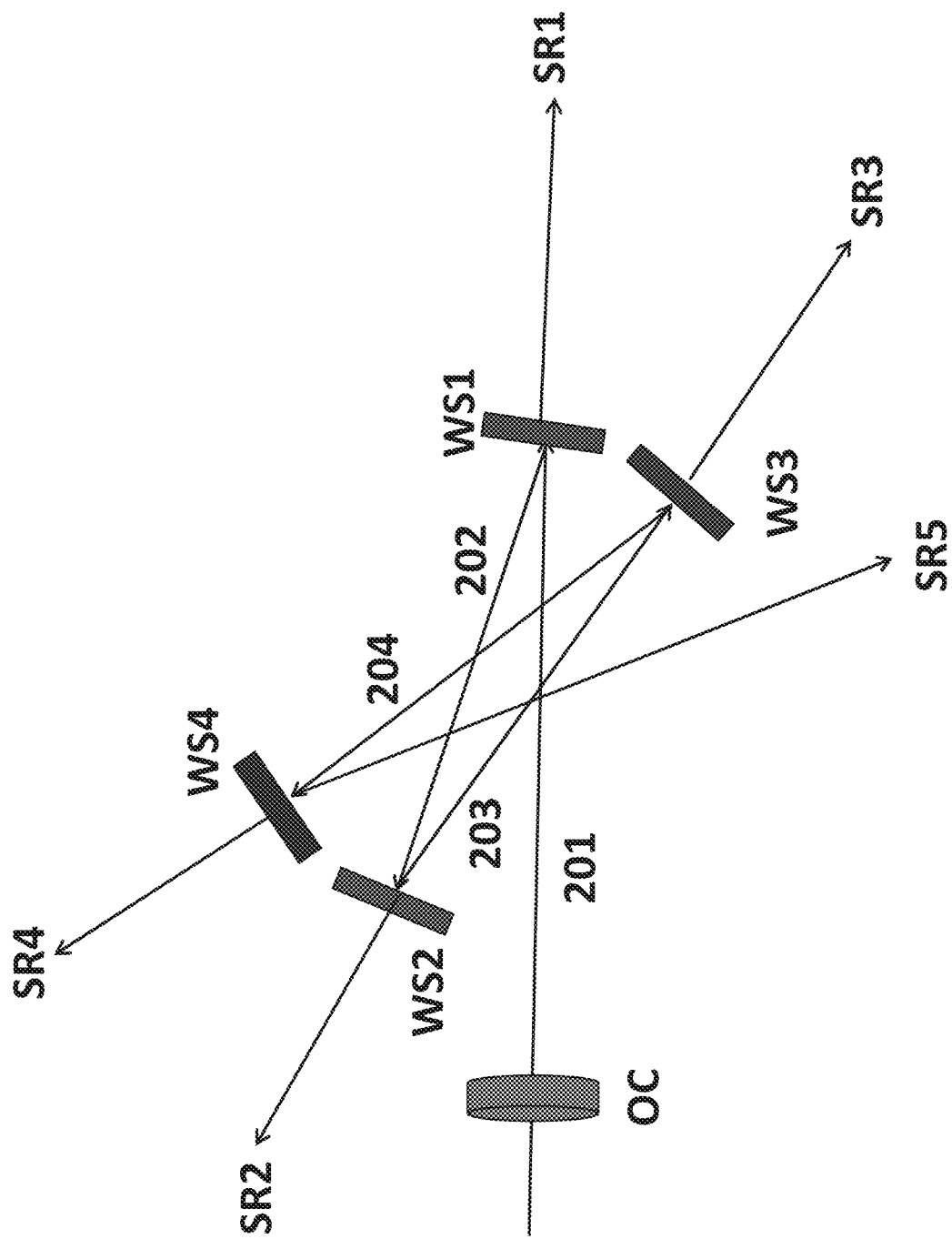
FIG. 1B depicts a configuration of wavelength separators positioned in a polygonal configuration in a light detection system according to certain embodiments.

FIG. 1B depicts a configuration of wavelength separators positioned in a polygonal configuration in a light detection system according to certain embodiments. Light from a sample is conveyed through an optical collection system OC having an optical component configured to pass light having a set of wavelengths 201 (e.g., 200 nm to 1200 nm) to a first wavelength separator WS1 that is configured to pass a first spectral range of light SR1 (e.g., 200 nm to 400 nm) and convey light having a set of wavelengths 202 (e.g., 400 nm to 1200 nm) to a second wavelength separator WS2. The second wavelength separator WS2 is configured to pass a second spectral range of light SR2 (e.g., 400 nm to 600 nm) and convey light having a set of wavelengths 203 (e.g., 600 nm to 1200 nm) to a third wavelength separator WS3. The third wavelength separator WS3 is configured to pass a third spectral range of light SR3 (e.g., 600 nm to 800 nm) and convey light having a set of wavelengths 204 (e.g., 800 nm to 1200 nm) to a fourth wavelength separator WS4. The fourth wavelength separator WS4 is configured to pass a fourth spectral range of light SR4 (e.g., 800 nm to 1000 nm) and convey light having a fifth spectral range of light SR5 (e.g., 1000 nm to 1200 nm). In this embodiment, light is conveyed along a star-shaped light path. Each of spectral ranges of light SR1, SR2, SR3, SR4 and SR5 are conveyed to one or more light detection modules (as described in greater detail below).

Figure 2:
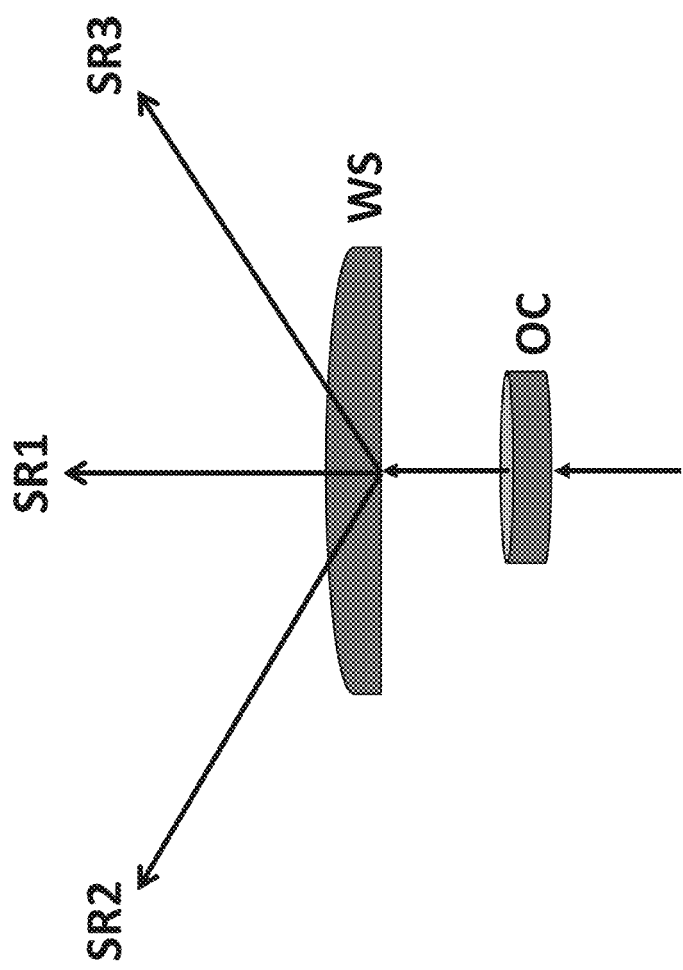
FIG. 2 depicts a wavelength separator that is configured to generate first, second and third spectral ranges of light according to certain embodiments.

FIG. 2 depicts a wavelength separator that is configured to generate first, second and third spectral ranges of light according to certain embodiments. Light from a sample is conveyed through an optical collection system OC having an optical component configured to pass light having a set of wavelengths (e.g., 200 nm to 1200 nm) to a wavelength separator WS that is configured to generate a first spectral range of light SR1, a second spectral range of light SR2 and a third spectral range of light SR3. Each of SR1, SR2, SR3 are each conveyed to a first, second and third light detection module (as described in greater detail below).

As summarized above, light detection systems include one or more light detection modules that are configured to receive the predetermined spectral ranges of light generated by the one or more wavelength separators. In some embodiments, light detection systems include a wavelength separator configured to generate first, second and third predetermined spectral ranges of light and first, second and third light detection modules configured to receive each of the first, second and third predetermined spectral ranges of light.

In some embodiments, light detection systems a light detection module in optical communication with each wavelength separator. In some embodiments, the light detection modules are positioned in physical contact with the wavelength separator, such as where an opening to the light detection module is physically coupled to the wavelength separator. In other embodiments, each light detection module is positioned from the wavelength separator by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more, such as by 15 mm or more, such as by 25 mm or more and including by 50 mm or more. For instance, each light detection module may be positioned from the wavelength separator by a distance of from 0.0001 mm to 100 mm, such as from 0.0005 mm to 95 mm, such as from 0.001 mm to 90 mm, such as from 0.005 mm to 85 mm, such as from 0.01 mm to 80 mm, such as from 0.05 mm to 75 mm, such as from 0.1 mm to 70 mm, such as from 0.5 mm to 65 mm, such as from 1 mm to 60 mm, such as from 1.5 mm to 55 mm and including from 2 mm to 50 mm.

Light detection modules may be releasably connected to the wavelength separator. The term "releasably" is used herein in its conventional sense such that each light detection module or wavelength separator may be freely detached and re-attached. Light detection modules or wavelength separators may be connected by any convenient protocol. In certain embodiments, the light detection modules and wavelength separators are connected together with a fastener, such as a hook and loop fasteners, magnets, latches, notches, countersinks, counter-bores, grooves, pins, tethers, hinges, Velcro, non-permanent adhesives or a combination thereof. In certain instances, a light detection module is connected to a wavelength separator by slot-fitting the wavelength separator into a groove of the light detection module. In yet other instances, a wavelength separator is connected to a light detection module by one or more screws.

In some embodiments, light from each wavelength separator is conveyed to each light detection module by an optical collection system. Each optical collection system may be any suitable light collection protocol that collects the spectral range of light passed by the wavelength separator and directs the light to the light detection module. In some embodiments, the optical collection system includes fiber optics, such as a fiber optics light relay bundle. In other embodiments, the optical collection system is a free-space light relay system.

In embodiments, each optical collection system may be physically coupled to the light detection module, such as with an adhesive, co-molded together or integrated into each light detection module. In certain embodiments, each light detection module and optical collection system are integrated into a single unit. In some instances, each light detection module is coupled to an optical collection system with an connector that fastens the optical collection system to each light detection module, such as with a hook and loop fasteners, magnets, latches, notches, countersinks, counter-bores, grooves, pins, tethers, hinges, Velcro, non-permanent adhesives or a combination thereof.

In other embodiments, each light detection module and optical collection system are in optical communication, but are not physically in contact. In embodiments, the optical collection system may be positioned 0.001 mm or more from the light detection module, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection module.

In certain embodiments, the optical collection system includes fiber optics. For example, the optical collection system may be a fiber optics light relay bundle and the spectral range of light passed by the wavelength separator is conveyed through the fiber optics light relay bundle to the light detection module. Any fiber optics light relay system may be employed to convey light, where in certain embodiments, suitable fiber optics light relay systems include, but are not limited to, fiber optics light relay systems such as those described in U.S. Pat. No. 6,809,804, the disclosure of which is herein incorporated by reference.

In other embodiments, each optical collection system is a free-space light relay system. The phrase "free-space light relay" is used herein in its conventional sense to refer to light propagation that employs a configuration of one or more optical components to direct the spectral range of light passed by the wavelength separator to the light detection module through free-space. In certain embodiments, the free-space light relay system includes a housing having a proximal end and a distal end, the proximal end being coupled to the light detection module. The free-space relay system may include any combination of different optical components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating the spectral range of light from a wavelength separator include, but are not limited to, light relay systems such as those described in U.S. Pat. Nos. 7,643,142; 7,728,974 and 8,223,445, the disclosures of which is herein incorporated by reference.

The light detection modules may be arranged (e.g., co-mounted together) in any geometric configuration in the subject light detection systems as desired. The light detection modules may be arranged along one or more plane. In some embodiments, the light detection modules may be oriented with respect to each other (as referenced in an X-Z plane) at an angle ranging from 0° to 180°, such as from 10° to 170°, such as from 20° to 160°, such as from 25° to 150°, such as from 30° to 120° and including from 45° to 90°. In embodiments, the light detection modules may be arranged with respect to each other at an angle that is the same or different depending on the number of light detection modules in the light detection system. For example, in certain instances the angle between a first light detection module and a second light detection module is the same as the angle between the second light detection modules and a third light detection module. In some embodiments, the angle between a first light detection module and a second light detection module are different than the angle between the second light detection module and a third light detection module. In some embodiments, the light detection modules are positioned in a geometric arrangement such as a star-shaped configuration, a triangular configuration, a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations.

In some embodiments, each light detection module includes an optical adjustment component configured to convey light having a predetermined sub-spectral range to one or more photodetectors. By "optical adjustment" is meant that light is changed or adjusted when conveyed to each photodetector in the light detection module. In some embodiments, optical adjustment includes propagating light having a predetermined sub-spectral range to a photodetector. In some embodiments, each light detection module includes one or more optical adjustment components that are configured to separate light conveyed from the wavelength separator into predetermined sub-spectral ranges by passing light having a predetermined sub-spectral range and reflecting one or more remaining spectral ranges of light. In other embodiments, the optical adjustment component is configured to separate light conveyed from the wavelength separator into predetermined sub-spectral ranges by passing light having a predetermined sub-spectral range and absorbing one or more remaining spectral ranges of light. In yet other embodiments, the optical adjustment component is configured to spatially diffract light conveyed from the wavelength separator into the predetermined sub-spectral ranges. Optical adjustment components may be any convenient light separation protocol, such as one or more dichroic mirrors, bandpass filters, diffraction gratings, beam splitters or prisms. In certain embodiments, optical adjustment components in the light detection modules that are configured to separate light conveyed from the wavelength separator into predetermined sub-spectral ranges are dichroic mirrors.

Depending on the wavelengths of light passed from the wavelength separator to the light detection module (as described above), the one or more optical components in the light detection module may be configured to convey light having wavelengths that range from a first wavelength, $Y_i$ (in nanometers, nm) to a second wavelength $Y_n$ (in nanometers, nm) to the photodetectors. In some embodiments, the one or more optical components are configured to convey light having wavelengths that range from 100 nm to 1500 nm to the photodetectors, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including propagating light having wavelengths that range from 600 nm to 1000 nm to the photodetectors.

In embodiments, the optical components in each light detection module are configured to convey a predetermined sub-spectral range of light, $Y_s$ (in nanometers, nm) to each photodetector. The predetermined sub-spectral ranges conveyed by each optical component may vary, where certain optical components of interest are configured to convey sub-spectral ranges of light that span from 5 nm to 50 nm, such as from 6 nm to 49 nm, such as from 7 nm to 48 nm, such as from 8 nm to 47 nm, such as from 9 nm to 46 nm and including from nm to 45 nm. In certain embodiments, the optical component is configured to pass a spectral range of light that spans 20 nm.

For instance, in one example the one or more optical components are configured to pass light having wavelengths that range from 360 nm (i.e., $Y_i$=360 nm) to a 480 nm (i.e., $Y_n$=480 nm) in sub-spectral ranges that span 20 nm (i.e., $Y_s$=20 nm). In this embodiment, the light detection module includes a first optical component that is configured to convey light having wavelengths that range from 360 nm to 380 nm to a photodetector; a second optical component that is configured to convey light having wavelengths that range from 380 nm to 400 nm to a photodetector; a third optical component that is configured to convey light having wavelengths that range from 400 nm to 420 nm to a photodetector; a fourth optical component that is configured to convey light having wavelengths that range from 420 nm to 440 nm to a photodetector; a fifth optical component that is configured to convey light having wavelengths that range from 440 nm to 460 nm to a photodetector; and a sixth optical component that is configured to convey light having wavelengths that range from 460 nm to 480 nm to a photodetector.

In some embodiments, the optical components in each light detection module are in optical communication with each other, such as being positioned to convey light between each other. The optical components may be oriented with respect to each other in the light detection module (as referenced in an X-Z plane) at an angle ranging from 10° to 180°, such as from 15° to 170°, such as from 20° to 160°, such as from 25° to 150°, such as from 30° to 120° and including from 45° to 90°. In some instances, the optical components are positioned along a single plane. In other instances, the optical components are positioned along more than one plane. For example, the optical components may be positioned along two or more parallel planes, such as three or more, such as four or more and including five or more parallel planes. In certain instances, the optical components are arranged into a geometric configuration, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. In certain embodiments, the optical components are arranged in a hexagonal configuration. In other embodiments, the optical components are arranged in a heptagonal configuration.

In some embodiments, the optical components are configured to convey light between each other. In some instances, each optical component is configured to pass a spectral range of light and to convey (e.g., by reflection) one or more remaining spectral ranges of light to another optical component. In one example, the light detection module includes 3 optical components. The first optical component is configured to receive light from a wavelength separator and to pass a first sub-spectral range of light and convey a second sub-spectral range of light to the second optical component. The second optical component is configured to pass a third sub-spectral range of light and to convey a fourth sub-spectral range of light to the third optical component. In some instances, the third sub-spectral range of light is a portion of the second sub-spectral range of light, such as a sub-spectral range that spans 90% or less of the second sub-spectral range of light, such 85% or less, such as 80% or less, such as 75% or less, such as 70% or less, such as 65% or less, such as 60% or less, such as 55% or less, such as 50%. The third optical component is configured to pass a fifth sub-spectral range of light. In some instances, the fifth sub-spectral range of light is a portion of the fourth sub-spectral range of light, such as a sub-spectral range that spans 90% or less of the fourth sub-spectral range of light, such 85% or less, such as 80% or less, such as 75% or less, such as 70% or less, such as 65% or less, such as 60% or less, such as 55% or less, such as 50%.

In another example, the light detection module includes 5 optical components. The first optical component is configured to receive light from a wavelength separator and to pass a first sub-spectral range of light and convey a second sub-spectral range of light to the second optical component. The second optical component is configured to pass a third sub-spectral range of light and to convey a fourth sub-spectral range of light to the third optical component. In some instances, the third sub-spectral range of light is a portion of the second sub-spectral range of light, such as a sub-spectral range that spans 90% or less of the second sub-spectral range of light, such 85% or less, such as 80% or less, such as 75% or less, such as 70% or less, such as 65% or less, such as 60% or less, such as 55% or less, such as 50%. The third optical component is configured to pass a fifth sub-spectral range of light and to convey a sixth sub-spectral range of light to the fourth optical component. In some instances, the fifth sub-spectral range of light is a portion of the fourth sub-spectral range of light, such as a sub-spectral range that spans 90% or less of the fourth sub-spectral range of light, such 85% or less, such as 80% or less, such as 75% or less, such as 70% or less, such as 65% or less, such as 60% or less, such as 55% or less, such as 50%. The fourth optical component is configured to pass a seventh sub-spectral range of light and to convey an eighth sub-spectral range of light to the fifth optical component. In some instances, the seventh spectral range of light is a portion of the sixth spectral range of light, such as a spectral range that spans 90% or less of the sixth spectral range of light, such 85% or less, such as 80% or less, such as 75% or less, such as 70% or less, such as 65% or less, such as 60% or less, such as 55% or less, such as 50%. The fifth optical component is configured to pass a ninth sub-spectral range of light. In some instances, the ninth sub-spectral range of light is a portion of the eighth sub-spectral range of light, such as a sub-spectral range that spans 90% or less of the eighth sub-spectral range of light, such 85% or less, such as 80% or less, such as 75% or less, such as 70% or less, such as 65% or less, such as 60% or less, such as 55% or less, such as 50%.

Figure 3:
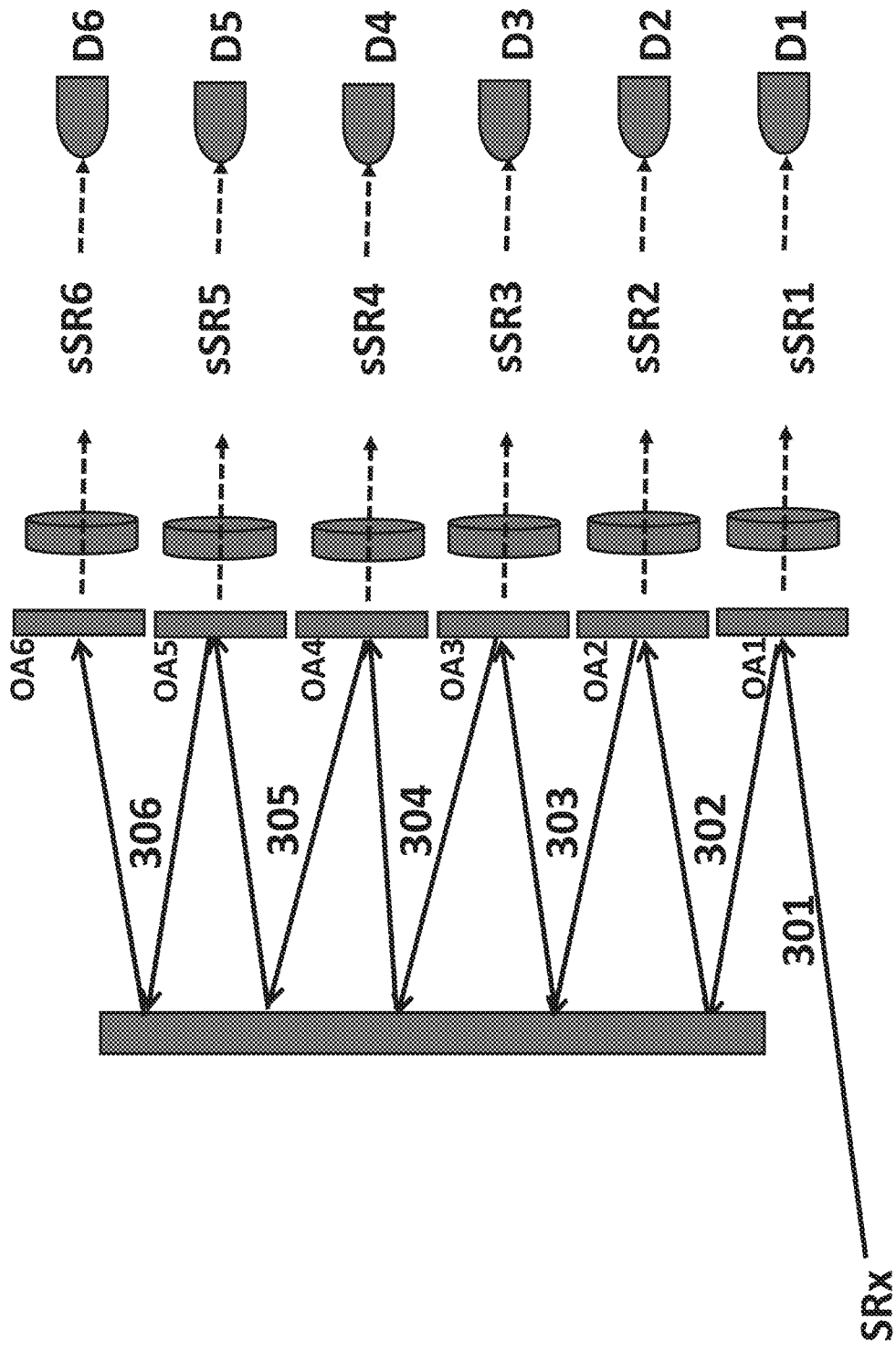
FIG. 3 depicts components of a light detection module positioned along two parallel axes according to certain embodiments.

FIG. 3 depicts components of a light detection module positioned along two parallel planes according to certain embodiments. A spectral range of light SRx from a wavelength separator (as described above) having a set of wavelengths 301 (e.g., 360 nm to 480 nm) is conveyed to a first optical component OA1 configured to pass a first sub-spectral range of light sSR1 (e.g., 360 nm to 380 nm) and convey light having a set of wavelengths 302 (e.g., 380 nm to 480 nm) to a second optical component OA2. The first sub-spectral range of light sSR1 is conveyed to a first photodetector D1. The second optical component OA2 is configured to pass a second sub-spectral range of light sSR2 (e.g., 380 nm to 400 nm) and convey light having a set of wavelengths 303 (e.g., 400 nm to 480 nm) to a third optical component OA3. The second sub-spectral range of light sSR2 is conveyed to a second photodetector D2. The third optical component OA3 is configured to pass a third sub-spectral range of light sSR3 (e.g., 400 nm to 420 nm) and convey light having a set of wavelengths 304 (e.g., 420 nm to 480 nm) to a fourth optical component OA4. The third sub-spectral range of light sSR3 is conveyed to a third photodetector D3. The fourth optical component OA4 is configured to pass a fourth sub-spectral range of light sSR4 (e.g., 420 nm to 440 nm) and convey light having a set of wavelengths 305 (e.g., 440 nm to 480 nm) to a fifth optical component OA5. The fourth sub-spectral range of light sSR4 is conveyed to a fourth photodetector D4. The fifth optical component OA5 is configured to pass a fifth sub-spectral range of light sSR5 (e.g., 440 nm to 460 nm) and convey light having a set of wavelengths 306 (e.g., 460 nm to 480 nm) to a sixth optical component OA6. The fifth sub-spectral range of light sSR5 is conveyed to a fifth photodetector D5. The sixth optical component OA6 is configured to pass a sixth sub-spectral range of light sSR6 (e.g., 460 nm to 480 nm). The sixth sub-spectral range of light sSR6 is conveyed to a sixth photodetector D6. In this embodiment, light is conveyed along a sequential zig-zag light path.

Figure 4:
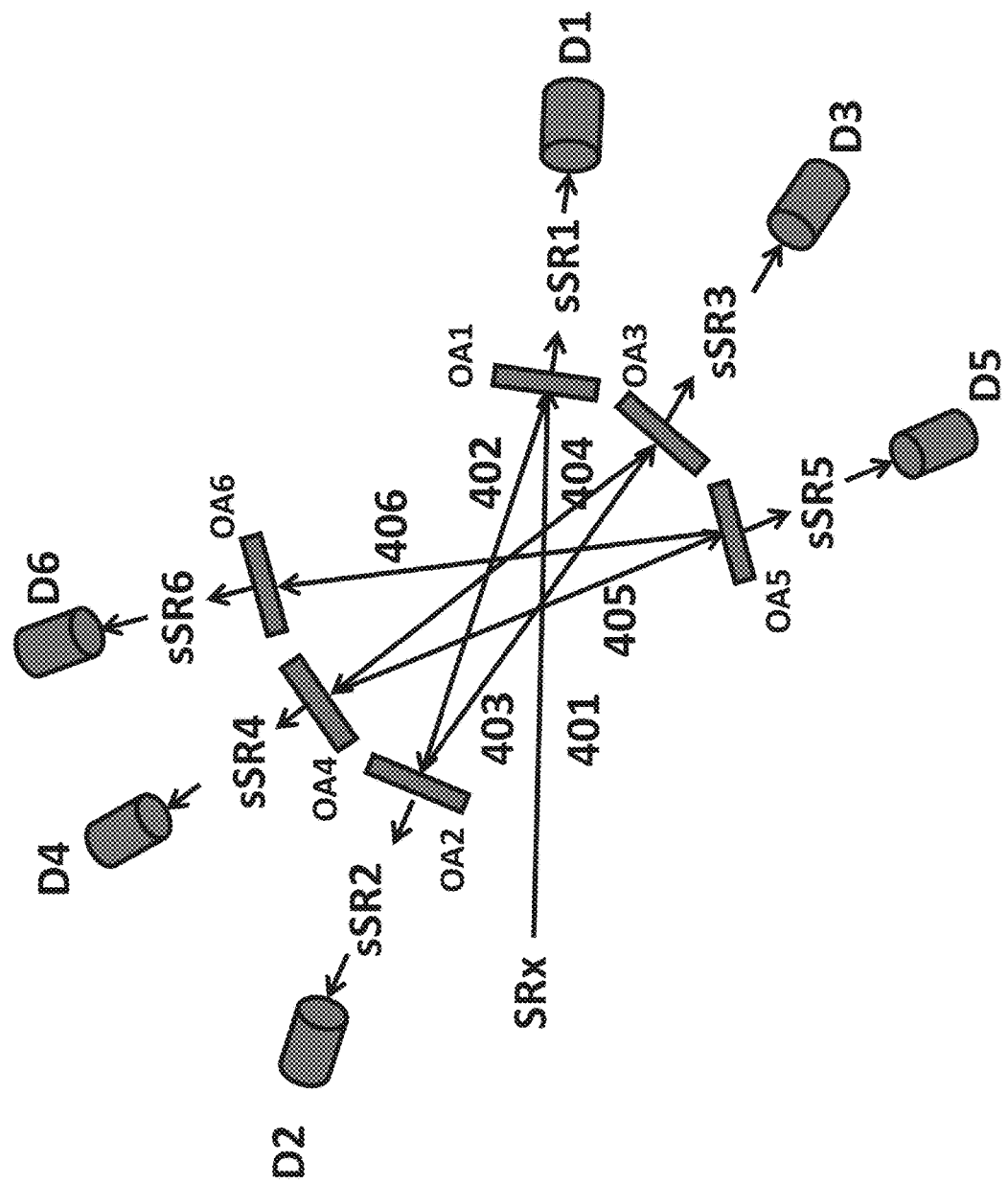
FIG. 4 depicts components of a light detection module positioned in a polygonal configuration according to certain embodiments.

FIG. 4 depicts components of a light detection module positioned in a polygonal configuration according to certain embodiments. A spectral range of light SRx from a wavelength separator (as described above) having a set of wavelengths 401 (e.g., 200 nm to 500 nm) is conveyed to a first optical component OA1 configured to pass a first sub-spectral range of light sSR1 (e.g., 200 nm to 250 nm) and convey light having a set of wavelengths 402 (e.g., 250 nm to 500 nm) to a second optical component OA2. The first sub-spectral range of light sSR1 is conveyed to a first photodetector D1. The second optical component OA2 is configured to pass a second sub-spectral range of light sSR2 (e.g., 250 nm to 300 nm) and convey light having a set of wavelengths 403 (e.g., 300 nm to 500 nm) to a third optical component OA3. The second sub-spectral range of light sSR2 is conveyed to a second photodetector D2. The third optical component OA3 is configured to pass a third sub-spectral range of light sSR3 (e.g., 300 nm to 350 nm) and convey light having a set of wavelengths 404 (e.g., 350 nm to 500 nm) to a fourth optical component OA4. The third sub-spectral range of light sSR3 is conveyed to a third photodetector D3. The fourth optical component OA4 is configured to pass a fourth sub-spectral range of light sSR4 (e.g., 350 nm to 400 nm) and convey light having a set of wavelengths 405 (e.g., 400 nm to 500 nm) to a fifth optical component OA5. The fourth sub-spectral range of light sSR4 is conveyed to a fourth photodetector D4. The fifth optical component OA5 is configured to pass a fifth sub-spectral range of light sSR5 (e.g., 400 nm to 450 nm) and convey light having a set of wavelengths 406 (e.g., 450 nm to 500 nm) to a sixth optical component OA6. The fifth sub-spectral range of light sSR5 is conveyed to a fifth photodetector D5. The sixth optical component OA6 is configured to pass a sixth sub-spectral range of light sSR6 (e.g., 450 nm to 500 nm). The sixth sub-spectral range of light sSR6 is conveyed to a sixth photodetector D6. In this embodiment, light is conveyed along a star-shaped light path.

Figure 5:
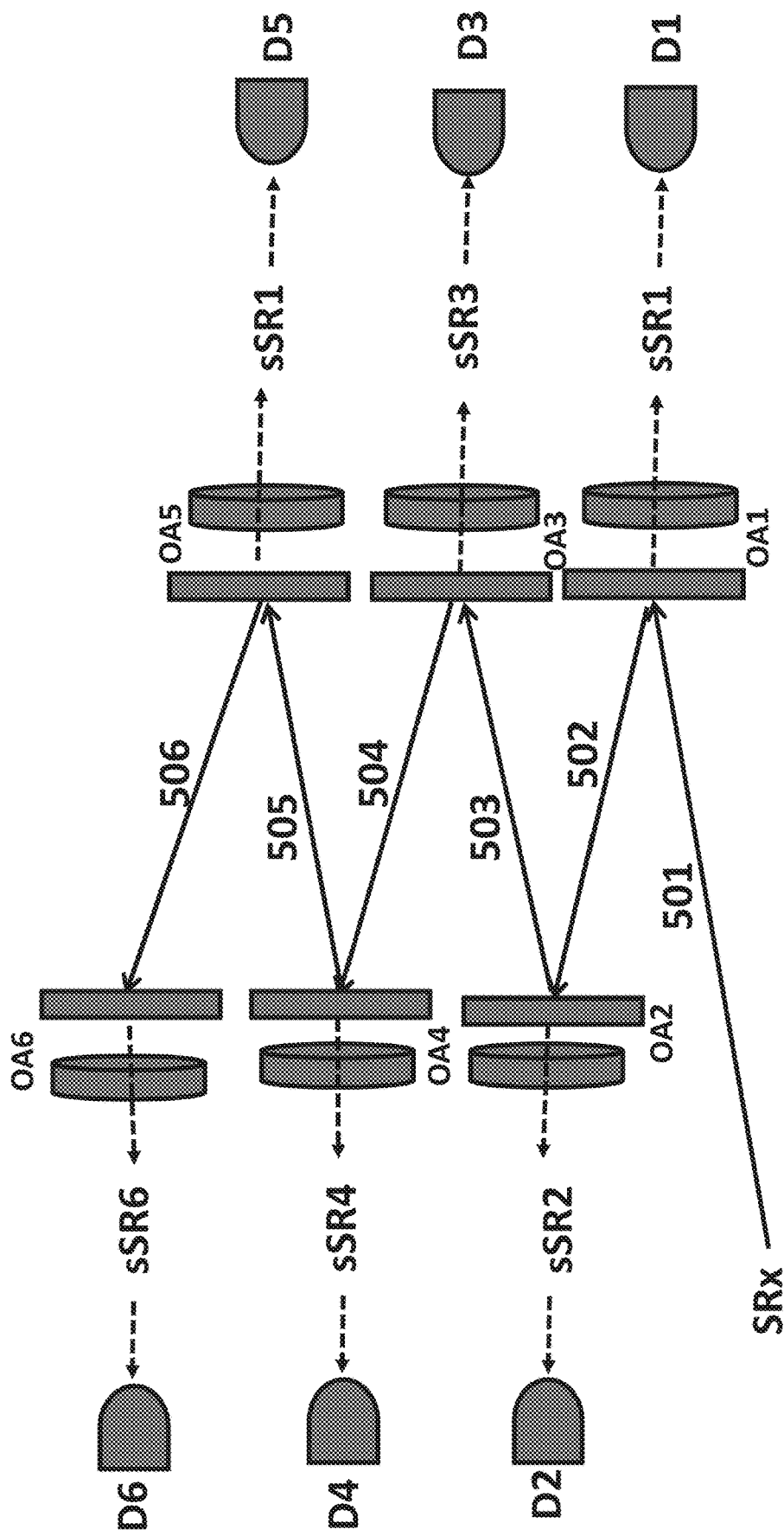
FIG. 5 depicts components of a light detection module positioned along two parallel planes according to certain embodiments.

FIG. 5 depicts components of a light detection module positioned along two parallel planes according to certain embodiments. A spectral range of light SRx from a wavelength separator (as described above) having a set of wavelengths 501 (e.g., 360 nm to 600 nm) is conveyed to a first optical component OA1 configured to pass a first sub-spectral range of light sSR1 (e.g., 360 nm to 400 nm) and convey light having a set of wavelengths 502 (e.g., 400 nm to 600 nm) to a second optical component OA2. The first sub-spectral range of light sSR1 is conveyed to a first photodetector D1. The second optical component OA2 is configured to pass a second sub-spectral range of light sSR2 (e.g., 400 nm to 440 nm) and convey light having a set of wavelengths 503 (e.g., 440 nm to 600 nm) to a third optical component OA3. The second sub-spectral range of light sSR2 is conveyed to a second photodetector D2. The third optical component OA3 is configured to pass a third sub-spectral range of light sSR3 (e.g., 440 nm to 480 nm) and convey light having a set of wavelengths 504 (e.g., 480 nm to 600 nm) to a fourth optical component OA4. The third sub-spectral range of light sSR3 is conveyed to a third photodetector D3. The fourth optical component OA4 is configured to pass a fourth sub-spectral range of light sSR4 (e.g., 480 nm to 520 nm) and convey light having a set of wavelengths 505 (e.g., 520 nm to 600 nm) to a fifth optical component OA5. The fourth sub-spectral range of light sSR4 is conveyed to a fourth photodetector D4. The fifth optical component OA5 is configured to pass a fifth sub-spectral range of light sSR5 (e.g., 520 nm to 560 nm) and convey light having a set of wavelengths 506 (e.g., 560 nm to 600 nm) to a sixth optical component OA6. The fifth sub-spectral range of light sSR5 is conveyed to a fifth photodetector D5. The sixth optical component OA6 is configured to pass a sixth sub-spectral range of light sSR6 (e.g., 560 nm to 600 nm). The sixth sub-spectral range of light sSR6 is conveyed to a sixth photodetector D6. In this embodiment, light is conveyed along a back-and-forth zig-zag light path.

As described above, light detection systems are configured to generate a plurality of sub-spectral ranges of light from the light collected from the sample. In some embodiments, light detection systems are configured to generate 2 or more distinct spectral ranges of light for every reflection by an optical component (e.g., dichroic mirror) in the light detection system, such as 3 or more, such as 4 or more and including being configured to generate 5 or more distinct spectral ranges of light for every reflection by an optical component in the subject light detection systems. In certain embodiments, light detection systems are configured to generate 30 distinct spectral ranges using 10 reflections by optical components or less, such as generating 30 distinct spectral ranges of light from 9 reflections by optical components or less. In certain instances, the ratio of generated distinct spectral ranges to number of reflections by optical components in the subject light detection systems may range from 2:1 to 10:1, such as from 3:1 to 7:1 and including from 3:1 to 5:1. In some instances, the optical component is configured to collimate the light. The term "collimate" is used in its conventional sense to refer to the optically adjusting the collinearity of light propagation or reducing divergence by the light of from a common axis of propagation. In some instances, collimating includes narrowing the spatial cross section of a light beam. In other instances, optical includes changing the direction of the light beam, such as changing the propagation of the light beam by 1° or more, such as by 5° or more, such as by 10° or more, such as by 15° or more, such as by 20° or more, such as by 25° or more, such as by 30° or more, such as by 45° or more, such as by 60° or more, such as by 75° or more and including changing the direction of light propagation by 90° or more. In yet other instances, optical is a de-magnification protocol so as to decrease the dimensions of the light (e.g., beam spot), such as decreasing the dimensions by 5% or more, such as by 10% or more, such as by 25% or more, such as by 50% or more and including decreasing the dimensions by 75% or more.

Each sub-spectral range of light is conveyed by the optical component to a photodetector. In some embodiments, the optical component is in physical contact with the photodetector. In other embodiments, the optical component is in optical communication with the active surface of the photodetector and may be positioned 0.001 mm or more from the photodetector, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the photodetector.

Photodetectors may be releasably connected to each optical component in the subject light detection modules. Photodetectors and optical components may be connected by any convenient protocol. In certain embodiments, the photodetectors and optical components are connected together by co-mounting the photodetector with the optical component or with a fastener, such as a hook and loop fasteners, magnets, latches, notches, countersinks, counter-bores, grooves, pins, tethers, hinges, Velcro, non-permanent adhesives or a combination thereof. In certain instances, a photodetector is connected to an optical component by slot-fitting the wavelength separator into a groove of the light detection module. In yet other instances, a photodetector is connected to an optical component by one or more screws.

In embodiments, each light detection module includes two or more photodetectors, such as 3 or more, such as 4 or more, such as 5 or more, such as 6 or more, such as 7 or more, such as 8 or more, such as 9 or more, such as or more, such as 15 or more, such as 25 or more, such as 50 or more and including 100 or more photodetectors. In some embodiments, light detection modules include one or more photodetector arrays. The term "photodetector array" is used in its conventional sense to refer to an arrangement or series of two or more photodetectors. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. The photodetectors in each array may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in each photodetector array may be oriented with respect to the other (as referenced in an X-Z plane) at an angle ranging from 10° to 180°, such as from to 170°, such as from 20° to 160°, such as from 25° to 150°, such as from to 120° and including from 45° to 90°.

The photodetectors may be any convenient optical sensor, such as active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In certain embodiments, photodetectors include photomultiplier tubes, such as metal package photomultiplier tubes.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In embodiments, the photodetectors are configured to measure light continuously or in discrete intervals. In some instances, photodetectors of interest are configured to take measurements of the collected light continuously. In other instances, the photodetectors are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Figure 6:
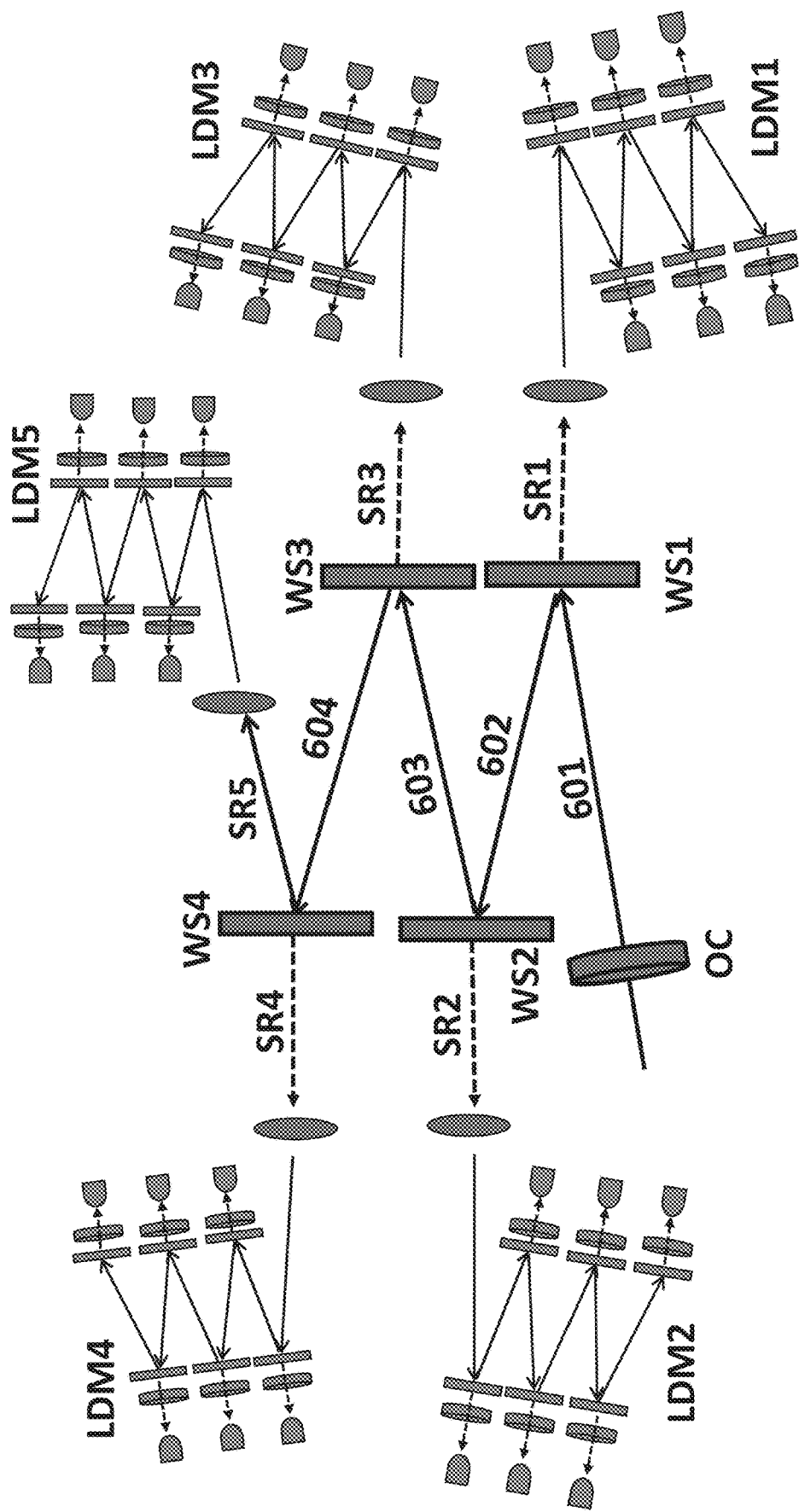
FIG. 6 depicts a light detection system having a plurality of wavelength separators and light detection modules according to certain embodiments.
Figure 7A:
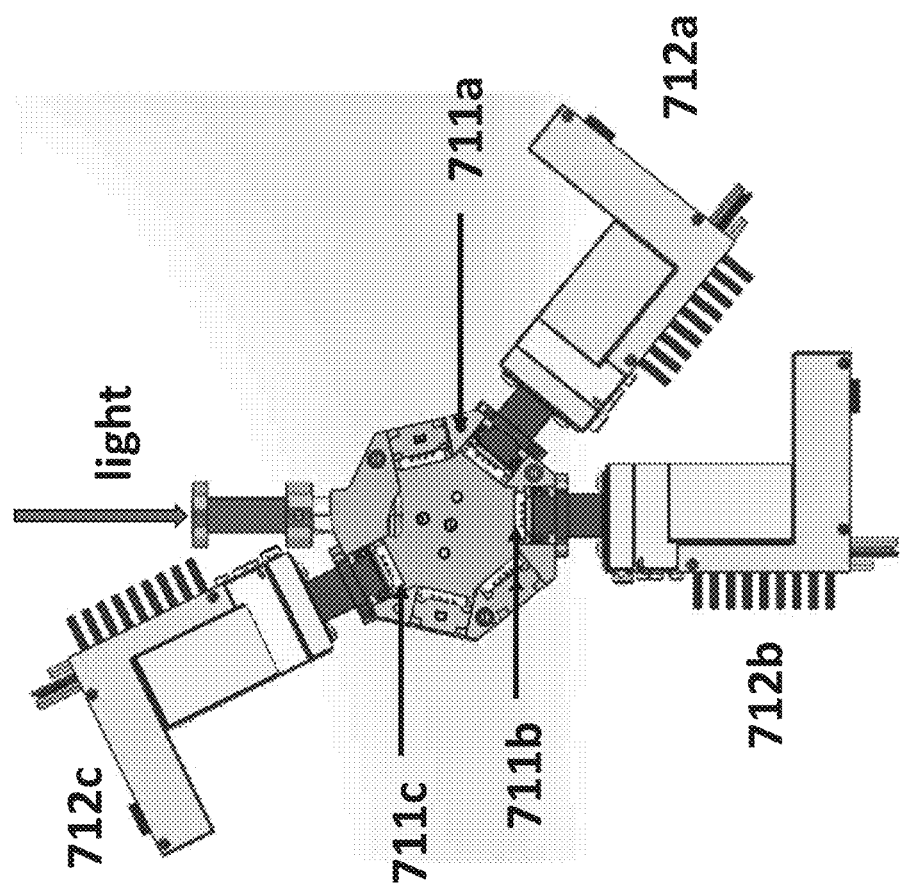
FIG. 7A-7E depicts light detection systems having 3 or more concentrically arranged wavelength separators optically coupled to light detection modules according to certain embodiments.
Figure 7B:
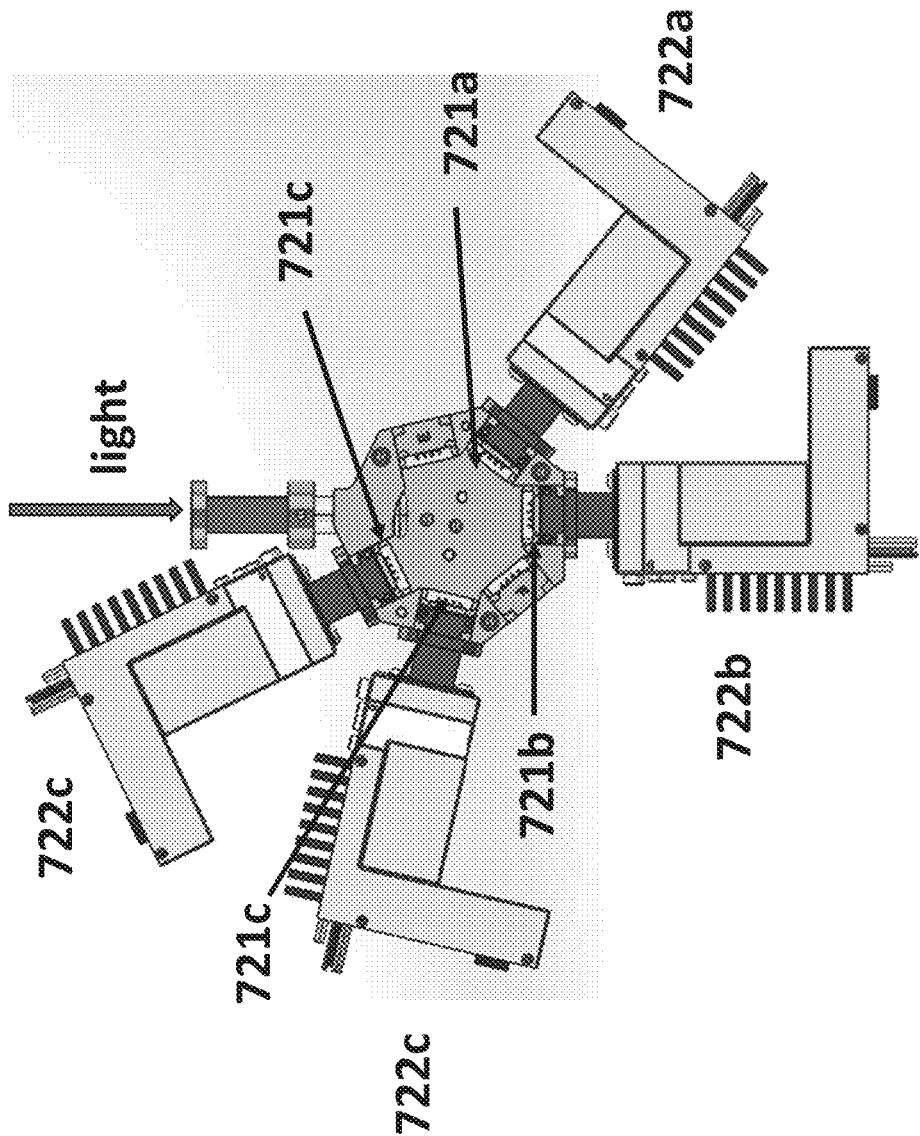
Figure 7C:
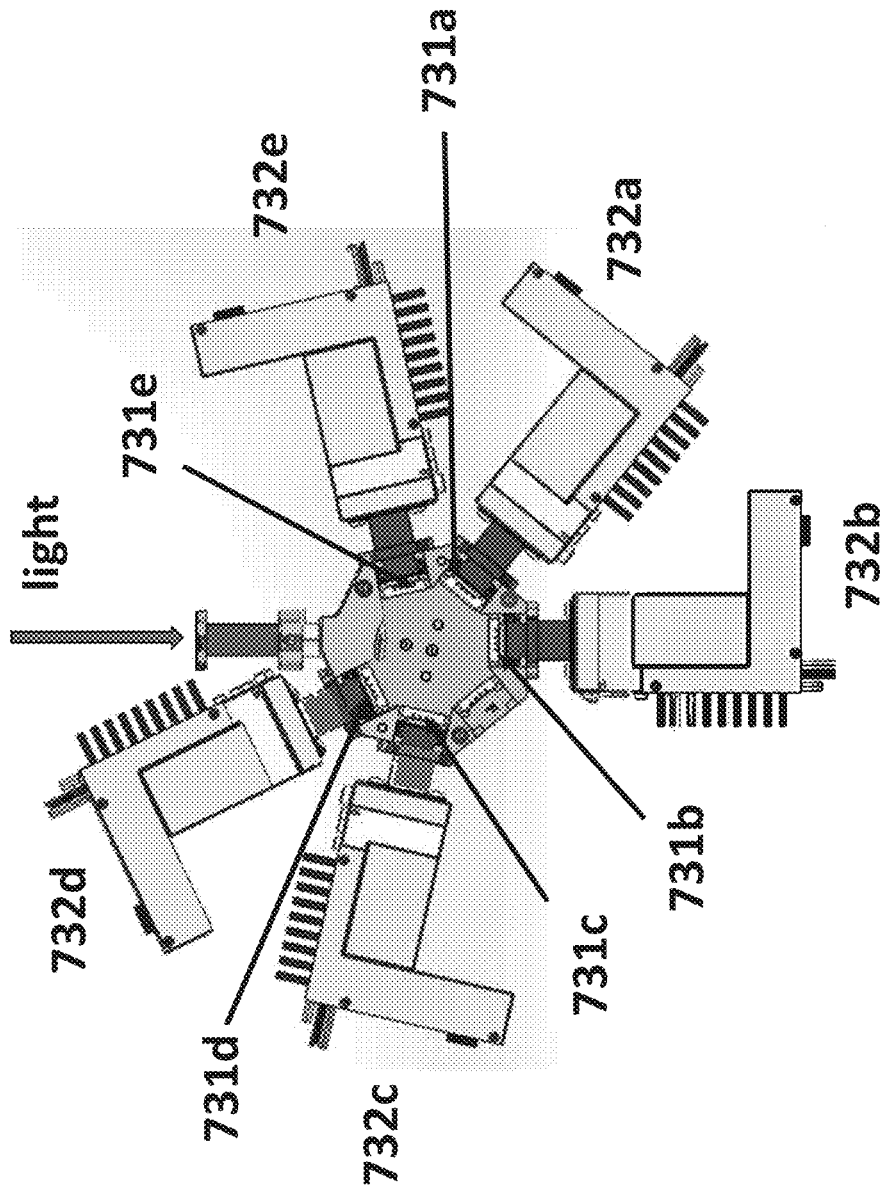
Figure 7D:
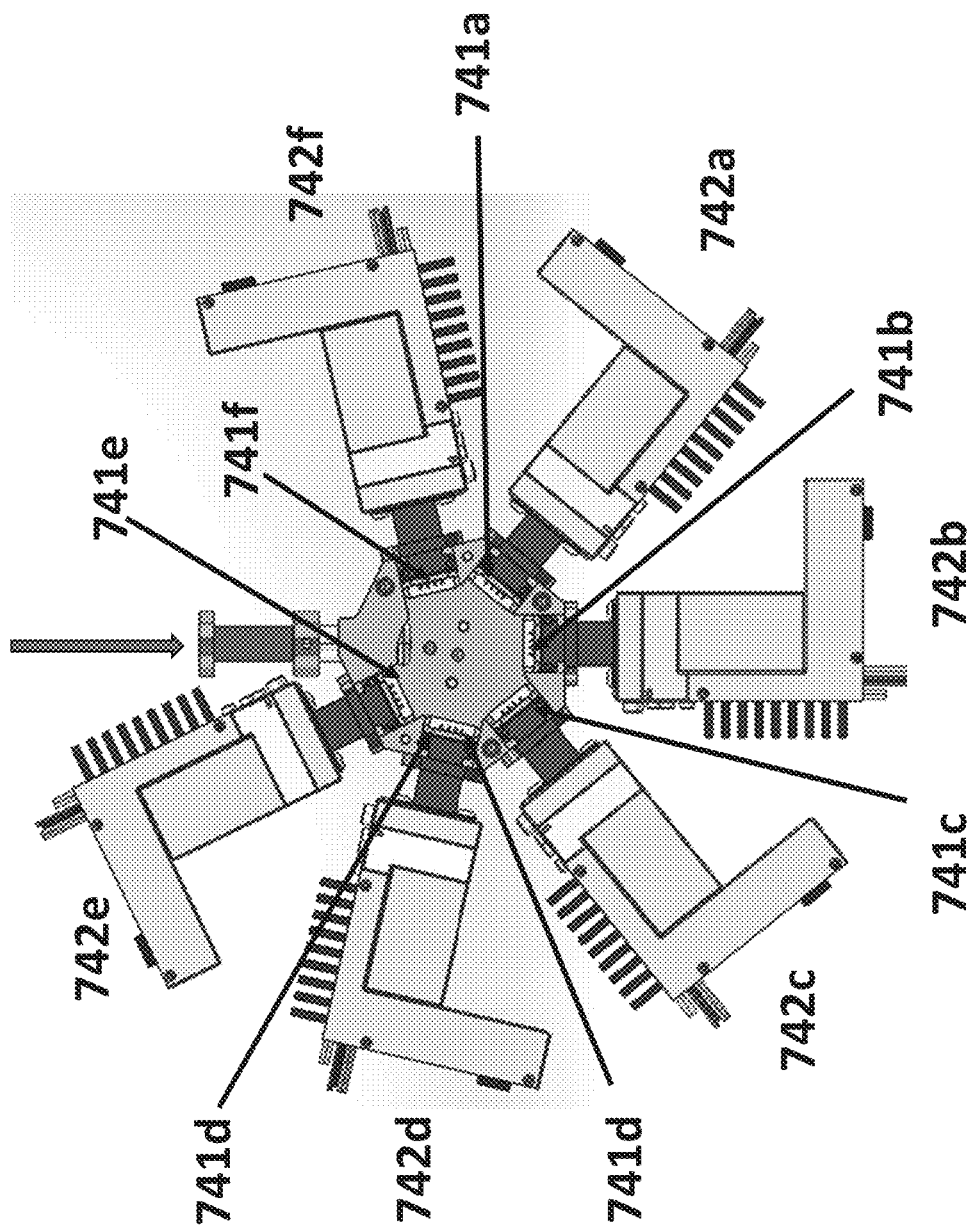
Figure 7E:
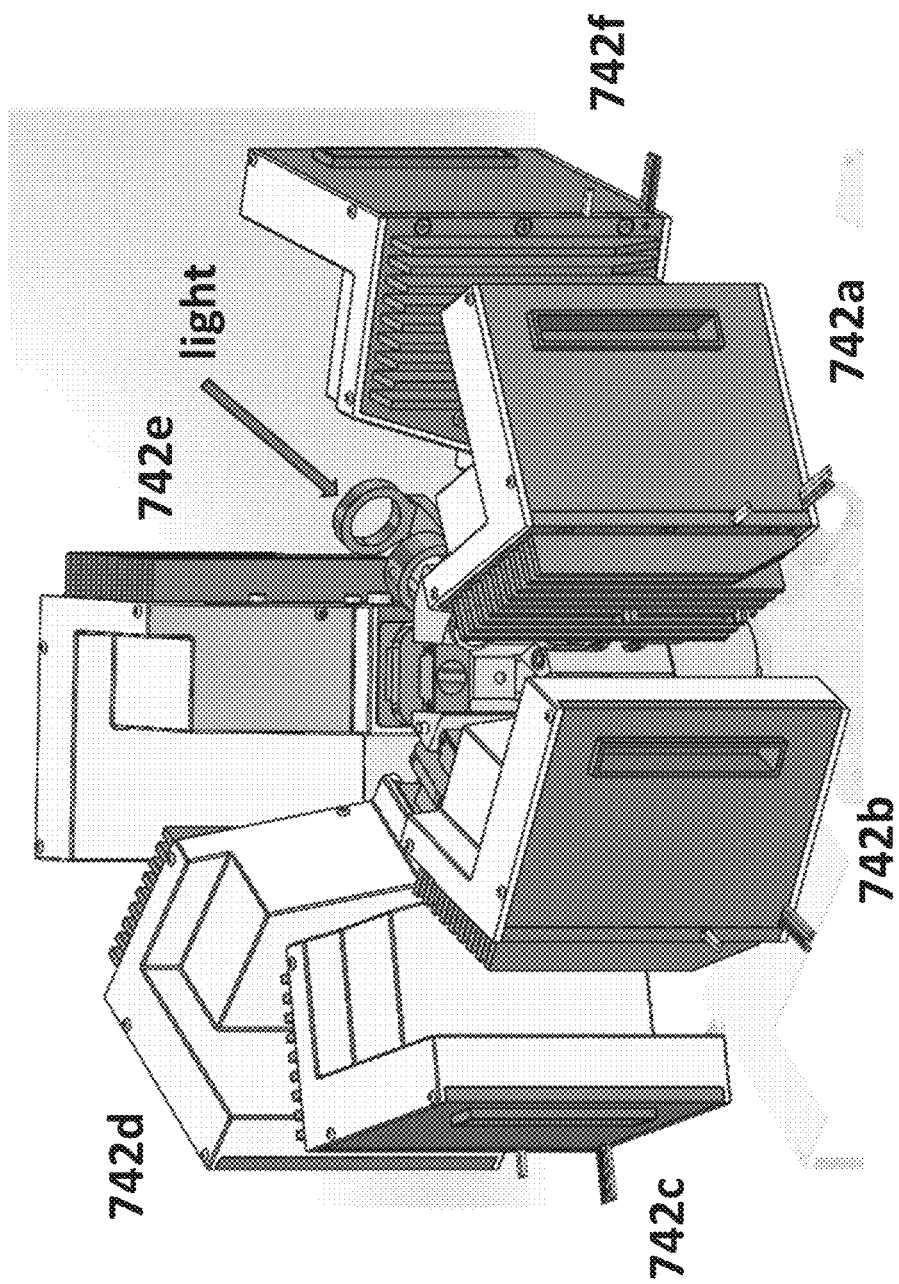

FIG. 6 depicts a light detection system having a plurality of wavelength separators and light detection modules according to certain embodiments. Light from a sample Light from a sample is conveyed through an optical collection system OC having an optical component configured to pass light having a set of wavelengths 601 to a first wavelength separator WS1 that is configured to pass a first spectral range of light SR1 and convey light having a set of wavelengths 602 to a second wavelength separator WS2. The light of spectral range SR1 is conveyed to a first light detection module LDM1. The second wavelength separator WS2 is configured to pass a second spectral range of light SR2 and convey light having a set of wavelengths 603 to a third wavelength separator WS3. The light of spectral range SR2 is conveyed to a second light detection module LDM2. The third wavelength separator WS3 is configured to pass a third spectral range of light SR3 and convey light having a set of wavelengths 604 to a fourth wavelength separator WS4. The light of spectral range SR3 is conveyed to a third light detection module LDM3. The fourth wavelength separator WS4 is configured to pass a fourth spectral range of light SR4 and convey light having a fifth spectral range of light SR5 to a fifth light detection module LDM5. The light of spectral range SR4 is conveyed to a fourth light detection module LDM4. In this embodiment, each of spectral ranges of light SR1, SR2, SR3, SR4 and SR5 are conveyed to light detection modules, LDM1, LDM2, LDM3, LDM4 and LDM5, respectively, which have a back-and-forth zig-zag configuration as described in FIG. 5 above.

FIG. 7 depicts light detection systems having 3 or more concentrically arranged wavelength separators optically coupled to light detection modules according to certain embodiments. FIG. 7A depicts a light detection system having three wavelength separators 711a, 711b and 711c. Each wavelength separator is optically coupled to a light detection module, 712a, 712b and 712c. FIG. 7B depicts a light detection system having four wavelength separators 721a, 721b, 721c and 721d. Each wavelength separator is optically coupled to a light detection module, 722a, 722b, 722c and 722d. FIG. 7C depicts a light detection system having five wavelength separators 731a, 731b, 731c, 731d and 731e. Each wavelength separator is optically coupled to a light detection module, 732a, 732b, 732c, 732d and 732e. FIG. 7D depicts a light detection system having six wavelength separators 741a, 741b, 741c, 741d, 741e and 741f. Each wavelength separator is optically coupled to a light detection module, 742a, 742b, 742c, 742d, 742e and 742f. FIG. 7E depicts a three dimensional view of the light detection system of FIG. 7D.

Systems for Measuring Light Emitted by a Sample

Aspects of the present disclosure also include systems for measuring light from a sample (e.g., in the flow stream in a flow cytometer). In certain embodiments, systems include a light source and a clustered wavelength division light detection system having three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors, as described above. In some embodiments, the system is a flow cytometer. In some instances, the light detection system is non-releasably integrated into the flow cytometer. In certain embodiments, the light detection system is in optical communication with the source of sample (e.g., the flow stream in a flow cytometer) through an optical collection system (e.g., fiber optics or free-space light relay system).

Systems of interest for measuring light from a sample include a light source. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa$_4$O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to about 50 V, such as from about 2 V to about 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In embodiments, light emitted by the sample is conveyed to the subject light detection systems (as described above), having two or more photodetector arrays. As described above, photodetectors in the subject photodetectors may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. For example, the light collection system for measuring light from a sample may include photodetectors arrays having 2 photodetectors or more, such as 3 photodetectors or more, such as 4 photodetectors or more, such as 5 photodetectors or more, such as 10 photodetectors or more, such as 25 photodetectors or more and including 50 photodetectors or more. In certain embodiments, systems include photodetector arrays with 5 photodetectors.

In embodiments of the present disclosure, detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In embodiments, the photodetectors of the light detection system are configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, systems for measuring light from sample include a optical collection system for collecting and directing light from the sample source (e.g., flow stream) to the subject light detections systems. The optical collection system may be physically coupled to the light detection system, such as with an adhesive, co-molded together or integrated into the light detection system. In certain embodiments, the optical collection system and the light detection system are integrated into a single unit. In other embodiments, the optical collection system is coupled to the light detection system with an connector, such as with a hook and loop fasteners, magnets, latches, notches, countersinks, counter-bores, grooves, pins, tethers, hinges, Velcro, non-permanent adhesives or a combination thereof.

In other embodiments, the light detection system and the optical collection system are in optical communication, but are not physically in contact. For example, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In some embodiments, the optical collection system includes fiber optics. For example, in some instances the optical collection system may be a fiber optics light relay bundle and light is conveyed through the fiber optics light relay bundle to the light detection system. In other embodiments, the optical collection system is a free-space light relay system. For instance, the free-space light relay system may include a housing having a proximal end and a distal end, the proximal end being coupled to the light detection system. The free-space relay system may include any combination of different optical components, such as one or more lenses, mirrors, slits, pinholes, wavelength separators, or a combination thereof.

In certain embodiments, the subject systems are flow cytometric systems employing the above described light detection system for detecting light emitted by a sample in a flow stream. In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem. January;* 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for imaging particles in a flow stream by fluorescence imaging using radiofrequency tagged emission (FIRE), such as those described in Diebold, et al. *Nature Photonics Vol.* 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Methods for Measuring Light Collected from an Irradiated Sample

Aspects of the disclosure also include methods for measuring light from a sample (e.g., in the flow stream in a flow cytometer). In practicing methods according to embodiments, a sample is irradiated with a light source and light from the sample is detected with the light detection systems having three or more wavelength separators that are each configured to pass light having a predetermined spectral range and one or more light detection modules in optical communication with each wavelength separator having a plurality of photodetectors and an optical component that conveys light having a predetermined sub-spectral range to the photodetectors as described above. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulium YAG laser, ytterbium YAG laser, $ytterbium_2O_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection system as described herein and measured by one or more photodetectors. In practicing the subject methods, light from the sample is conveyed to three or more wavelength separators that are each configured to pass light having a predetermined spectral range. The spectral ranges of light from each of the wavelength separators are conveyed to one or more light detection modules having optical components that are configured to convey light having a predetermined sub-spectral range to the photodetectors.

Light may be measured with the light detection systems continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Kits

Aspects of the invention further include kits, where kits include three or more wavelength separators, a plurality of photodetectors and one or more optical components (e.g., dichroic mirrors, beam splitters, collimating lenses, etc.). In some embodiments, kits include a substrate for co-mounting a wavelength separator with an optical component and a photodetector. In certain embodiments, kits include one or more fasteners for assembling together components of the subject light detection systems. Kits may also include an optical collection component, such as fiber optics (e.g., fiber optics relay bundle) or components for a free-space relay system. In some instances, kits further include one or more photodetectors, such as photomultiplier tubes (e.g., metal package photomultiplier tubes).

In some embodiments, kits include 2 or more of the components of the light detection systems disclosed herein, such as 3 or more and including 5 or more. In some instances, the kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject light detection systems find use where the characterization of a sample by optical properties, in particular where low levels of light are collected, is desired. In some embodiments, the systems and methods described herein find use in flow cytometry characterization of biological samples labelled with fluorescent tags. In other embodiments, the systems and methods find use in spectroscopy of transmitted or scattered light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. Embodiments of the present disclosure find use where enhancing the effectiveness of emission measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure also finds use in applications where cells prepared from a biological sample may be desired for research, laboratory testing or for use in therapy. In some embodiments, the subject methods and devices may facilitate the obtaining of individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
   detecting light from the flow stream with a light detection system comprising:
   three or more wavelength separators that are each configured to pass light having a predetermined spectral range; and
   one or more light detection modules in optical communication with each wavelength separator, wherein each light detection module comprises:
   a plurality of photodetectors; and
   an optical component configured to convey light having a predetermined sub-spectral range to the photodetectors.

2. The method according to claim 1, further comprising irradiating a sample in a flow stream in an interrogation field with a light source.

3. The method according to claim 1, wherein the flow stream is irradiated with a light source at a wavelength from 200 nm to 800 nm.

4. The method according to claim 2, wherein the light source is a laser.

5. The method according to claim 2, wherein light from the flow stream is conveyed to the light detection system with an optical collection component.

6. The method according to claim 5, wherein the optical collection component comprises fiber optics.

7. The method according to claim 6, wherein the optical collection component comprises a fiber optics light relay bundle.

8. The method according to claim 5, wherein the optical collection component comprises a free-space light relay system.

9. A method comprising:
   detecting light from the flow stream with a light detection system comprising:
   a wavelength separator configured to generate first, second and third predetermined spectral ranges of light from a light source; and
   first, second and third light detection modules configured to receive each of the first, second and third predetermined spectral ranges of light, wherein each of the first, second and third light detection modules comprises:
   a plurality of photodetectors; and
   an optical component configured to convey light having a predetermined sub-spectral range to the photodetectors.

10. The method according to claim 9, further comprising irradiating a sample in a flow stream in an interrogation field with a light source.

11. The method according to claim 9, wherein the flow stream is irradiated with a light source at a wavelength from 200 nm to 800 nm.

12. The method according to claim 10, wherein the light source is a laser.

13. The method according to claim 9, wherein light from the flow stream is conveyed to the light detection system with an optical collection component.

14. The method according to claim 13, wherein the optical collection component comprises fiber optics.

15. The method according to claim 14, wherein the optical collection component comprises a fiber optics light relay bundle.

16. The method according to claim 13, wherein the optical collection component comprises a free-space light relay system.

17. A method comprising:
    detecting light from the flow stream with a light detection system comprising:
    a wavelength separator configured to generate first, second and third predetermined spectral ranges of light from a light source; and
    first, second and third light detection modules configured to receive each of the first, second and third predetermined spectral ranges of light, wherein each of the first, second and third light detection modules are configured to generate a plurality of sub-spectral ranges of light,
    wherein each sub-spectral range of light exhibits a light loss of 20% or less as compared to the light from the light source.

18. The method according to claim 17, wherein each sub-spectral range of light exhibits a light loss of 15% or less as compared to the light from the light source.

19. The method according to claim 17, wherein the first, second and third light detection modules are configured to generate 20 or more sub-spectral ranges of light.

20. The method according to claim 17, wherein the first, second and third light detection modules each comprise a plurality of dichroic mirrors and are configured to generate the 20 or more sub-spectral ranges of light with 10 reflections or less.

21. The method according to claim 17, further comprising irradiating a sample in a flow stream in an interrogation field with a light source.

22. The method according to claim 17, wherein the flow stream is irradiated with a light source at a wavelength from 200 nm to 800 nm.

23. The method according to claim 21, wherein the light source is a laser.

24. The method according to claim 17, wherein light from the flow stream is conveyed to the light detection system with an optical collection component.

25. The method according to claim 24, wherein the optical collection component comprises fiber optics.

26. The method according to claim 24, wherein the optical collection component comprises a fiber optics light relay bundle.

27. The method according to claim 24, wherein the optical collection component comprises a free-space light relay system.

\* \* \* \* \*